C. TER COCK.
CLUTCH.
APPLICATION FILED SEPT. 25, 1918.
1,287,234.
Patented Dec. 10, 1918.
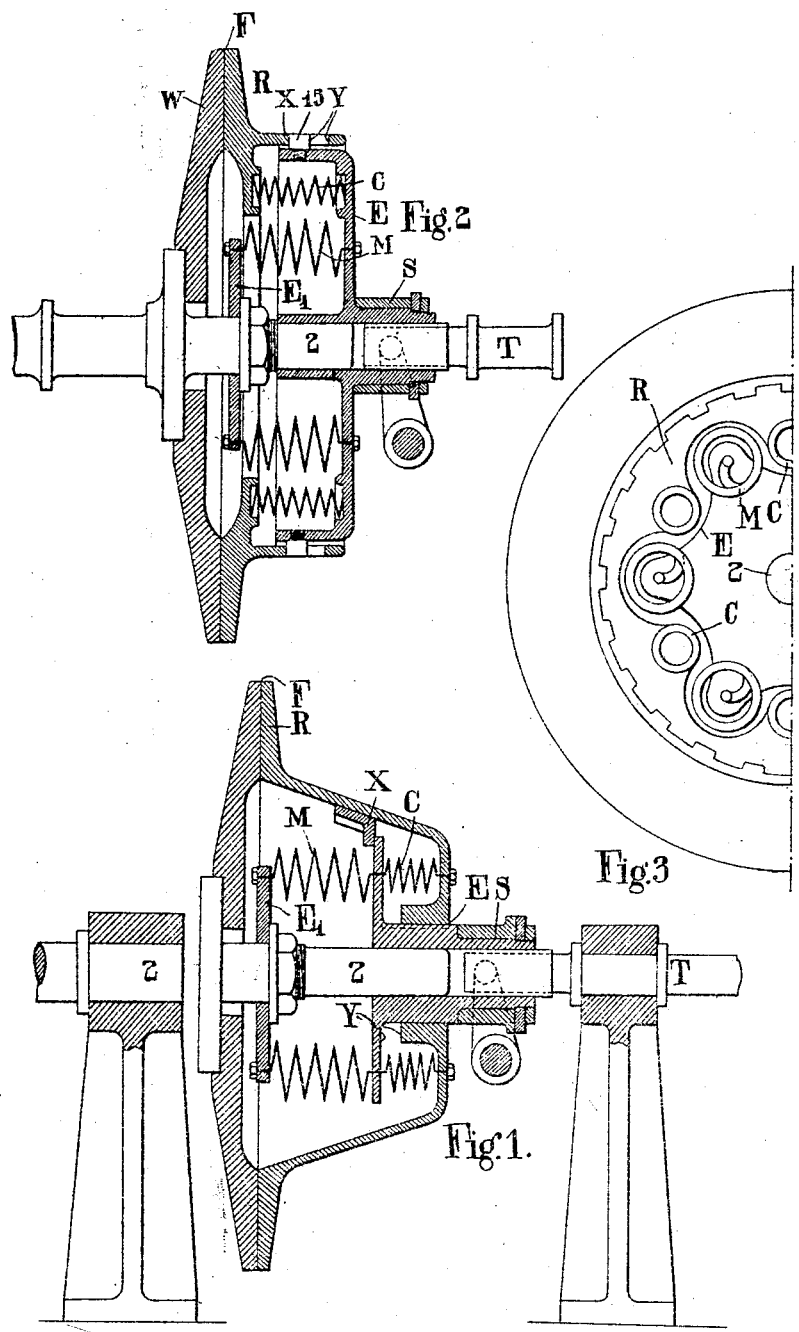

UNITED STATES PATENT OFFICE.

CHRIS ter COCK, OF BAARN, NETHERLANDS.

CLUTCH.

1,287,234.  Specification of Letters Patent.  Patented Dec. 10, 1918.

Application filed September 25, 1918. Serial No. 255,723.

*To all whom it may concern:*

Be it known that I, CHRIS TER COCK, a subject of the Queen of Holland, and residing at Eemnesserweg 63, Baarn, the Netherlands, have invented certain new and useful Improvements Relating to Clutches, of which the following is a specification.

This invention relates to slipping friction clutches of the type in which a cushion spring is provided in addition to the main spring, and in which the friction contact surfaces are pressed together when the clutch is engaged in such a manner that the whole axial load on the friction contact surfaces is transmitted through the said cushion spring during a predetermined portion of the period of engaging or disengaging.

In this type of clutch as hitherto proposed, the cushion spring and the main spring have been cylindrical helical compression springs co-axial with the axis of the clutch, thus necessitating a considerable increase in the axial space occupied by the clutch.

In the present invention the effort transmitted by the main spring is a tensile effort parallel to the axis of the clutch, the main spring may be made in many forms and a plurality of springs may be used. The cushion springs may be either in tension or compression, and a plurality of cushion springs is preferably employed.

The invention consists in providing a tension spring or springs between the driving member of the clutch and an intermediate member which turns with the driven member and moves axially with the "slider" by which the clutch is operated, and in providing cushion springs between the said slider and the driven element of the clutch.

The invention further consists in the slipping clutches hereinafter described.

The invention may be applied to friction clutches of any of the well known types, cone clutches, single plate clutches, multiple plate clutches.

I append drawings illustrating my invention as applied to clutches in which the friction contact surface is a flat disk.

Figure 1 is a sectional view illustrating a friction clutch with a plurality of main and cushion springs in tension, in which the driving and driven members are mounted in separate bearings co-axial with each other, as is well known in clutches for millwork or for direct coupling the prime mover and the driven machine.

Fig. 2 is a sectional view illustrating the clutch with a plurality of main springs and cushion springs, the main springs being in tension and the cushion springs in compression. In Fig. 2 the cushion springs are shown at a greater radial distance than the main springs.

Fig. 3 is an end view with a portion removed showing a modification of the clutch shown in Fig. 2, the main springs and cushion springs being all set at the same radial distance.

The driving member or flywheel W is fastened to the driving shaft 2 in any suitable manner. The driven member R is slidable relative to, and rotates with, a driven element E which in turn is slidable relative to, and rotates with, the driven shaft T. The main spring or springs M and the cushion springs C act in opposition against the driven element E, or against parts connected thereto and which move axially and rotate therewith. In the example illustrated, the main springs are fastened to the driven element E and to a disk E¹, suitably mounted on the driving shaft with a thrust bearing (preferably a ball bearing) interposed. The axial movement while engaging or disengaging the clutch is effected by a slider S mounted on the driven element E, with an end thrust bearing (preferably a ball bearing) interposed. The slider S is moved by well known means, for example, by a foot pedal in the case of a motor-car clutch, or by a handwheel and screw in the case of a clutch for engines, machine tools, electric generators and the like, or by electrical means.

In the drawings, the end thrust bearings are shown as plain collar bearings, but ball bearings are preferably used.

In Fig. 1 a number of lugs or the like X are detachably fastened to the driven member R during assemblage in such a manner that when the clutch is fully engaged the effort of the main springs is transmitted by the direct contact of the said lugs X with the member E. On withdrawing the clutch from engagement by moving the slider S to the right, the contact at X between the members R and E is disturbed but the pressure at the friction contact surface F is maintained by the effort transmitted by the cushion springs. On continuing the movement of the slider S away from the clutch, the tension transmitted by the cushion springs is diminished and ultimately the members E and R again come into contact at the surfaces Y. During the further movement of the slider S outward, the driven member R moves out of contact with W, the axial movement of the driven member R being then exactly the same as that of the slider S.

In Fig. 2 the stop surfaces which determine when direct contact takes place between the members E and R, are in the form of a plurality of pins or the like 15 screwed to the member E and engaging in axial slotted holes in the driven member R.

In a clutch made according to my invention the first small movement of the slider during disengaging of the clutch reduces the pressure at the stop surfaces X to zero, when the axial load on the friction contact surface F is that due to the maximum load to which the cushion spring is adjusted. The further movement of the slider diminishes the effort on the cushion springs until when the surfaces Y come into contact the axial load on the friction contact surface F is that due to the minimum load to which the cushion springs are adjusted. A further slight movement of the slider increases the pressure of the stop surfaces Y and reduces the load on the friction contact surface to zero, and a still further movement of the slider withdraws the driven clutch member R bodily from the driving member W.

During the inward movement of the slider for clutch-engagement the action of the parts takes place in reverse sequence to that just described. That is, as soon as the contact at Y between the members E and R is broken, the cushion springs transmit their minimum effort to the friction contact surface F; as the movement of the slider continues the effort transmitted by the cushion springs increases, reaching its maximum when the said members are in contact at X; and on the slider S being left quite free, the full effort of the main spring or springs is transmitted to the friction contact surface F, partly through the cushion springs and partly by the direct contact at X.

Thus it will be seen that my invention provides a more effective control of the load on the friction contact surfaces of the clutch, a definite increase or diminution of such load being produced by a definite amount of movement of the slider, whereas in the ordinary clutch the load is reduced from the maximum to zero by a very small movement of the slider; in the latter case the load on the friction contact surfaces being determined rather by the pressure exerted on the slider than by the position thereof.

Having now described my invention, what I claim as new and desire to secure by Letters Patent is:—

1. In combination with a rotatable shaft, a driving clutch member fixed to said shaft, a driven clutch member coöperating with the other member and comprising a plurality of parts movable relative to each other, a driven mounting, one of said parts being slidably mounted on said driven mounting and the other part being adapted to engage the driving clutch member, a series of coiled tension springs arranged between the clutch members, extending parallel to said shaft, and connected to the slidably mounted part of the driven clutch member for drawing the driven member toward the driving member, a plurality of stop surfaces carried by the part of the driven member which engages the driving member, an element carried by the slidably mounted part and engaging one of the stop surfaces when the clutch members are in contact, a series of coiled springs arranged between the parts of the driven member, extending parallel to said shaft and adapted to hold the driven member in contact with the driving member when the slidably mounted member is moved away from the driving member, the last named springs holding the driven member in contact with the driving member until said element engages the other stop surface, and means for moving the slidably mounted part of the driven member.

2. In combination with a rotatable shaft, a driving clutch member fixed to said shaft, a driven mounting, a driven element coöperating with said driving member and comprising two relatively movable parts, one of said parts being slidably mounted on said driven mounting and the second part being slidably mounted on the first part, first and second stop surfaces carried by the second part, an element carried by the first part and coöperating with the stop surfaces to move the two parts in unison, tension springs located between the members and extending parallel to said shaft for drawing the driven member toward the driving member and for drawing said element toward the first stop surface, coiled springs arranged between the parts of the driven member and extending parallel with said shaft for holding the second part in contact with the driving clutch member during the time that said element is moved toward the second stop surface, and means for moving the first part of the driven member.

3. In combination with a rotatable shaft, a driving clutch member fixed to said shaft, a driven mounting, a driven clutch member coöperating with said driving member and comprising a first part slidably mounted on the driven mounting and a second part slidably mounted on the first part, tension springs located between the members and connected to the first part for drawing the clutch members together and resisting the movement of the members away from each other, coil springs located between the parts of the driven member and holding the second part in contact with the driving member when the first part is moved away from the driving member, means limiting the relative movement of the parts, and means for sliding the first part on said driven mounting.

4. In combination with a rotatable shaft, a driving clutch member fixed to said shaft, a driven shaft, a driven member coöperating with said driving member and comprising a first part slidably mounted on the driven shaft and a second part slidably mounted on the first part, a disk rotatably mounted on the first shaft between said members, one of said parts being provided with slots, lugs carried by the other part and arranged in said slots, a series of tension springs connecting said disk and the first part of the driven member for drawing the driven member toward the driving member, compression springs located between the parts of the driven member and holding the second part in contact with the driving member when the first part is moved away from the driving member, and means for moving the first part of the driven member.

In testimony whereof I have signed my name to this specification.

CHRIS TER COCK.

Witnesses:
D. KLIYN,
M. ALVARAZ.

Copies of this patent may be obtained for five cents each, by addressing the "Commissioner of Patents, Washington, D. C."